United States Patent [19]
Kortenhaus

[11] 3,838,259
[45] Sept. 24, 1974

[54] CIRCUIT ARRANGEMENT FOR GENERATING PSEUDO RANDOM NUMBERS

[75] Inventor: Dieter Kortenhaus, Bingen, Germany

[73] Assignee: NSM Apparatebau GmbH Kommanditgesellschaft, Bingen/Rhine, Germany

[22] Filed: Apr. 5, 1973

[21] Appl. No.: 348,221

[30] Foreign Application Priority Data

Apr. 7, 1972 Germany ........................... 2216633

[52] U.S. Cl. ................................. 235/152, 331/78
[51] Int. Cl. ............................................ G06f 7/00
[58] Field of Search ....................... 235/152; 331/78; 273/138 A

[56] References Cited

UNITED STATES PATENTS

| | | | |
|---|---|---|---|
| 3,366,779 | 1/1968 | Catherall et al. | 235/152 |
| 3,548,174 | 12/1970 | Knuth | 235/152 |
| 3,703,727 | 11/1972 | Knowlton | 235/152 X |
| 3,706,941 | 12/1972 | Cohn | 331/78 |

*Primary Examiner*—Malcolm A. Morrison
*Assistant Examiner*—David H. Malzahn
*Attorney, Agent, or Firm*—Wolfgang G. Fasse; Willard W. Roberts

[57] ABSTRACT

A circuit for generating pseudo random numbers includes an adder stage having a multiplier connected for serial bit multiple addition. The adder stage is controlled by a sequence switch. The adder stage includes a first register connected to receive a preceding random number, a second register having a constant number, means connected for the serial addition of the outputs of the first and second registers, and a sum register connected to receive the results of the multiple addition. The output of the sum register is connected to the input of the first register under control of the sequence switch. An additional register may be provided, in addition to serial subtractor means for combining the outputs of the sum register and the additional register.

11 Claims, 1 Drawing Figure

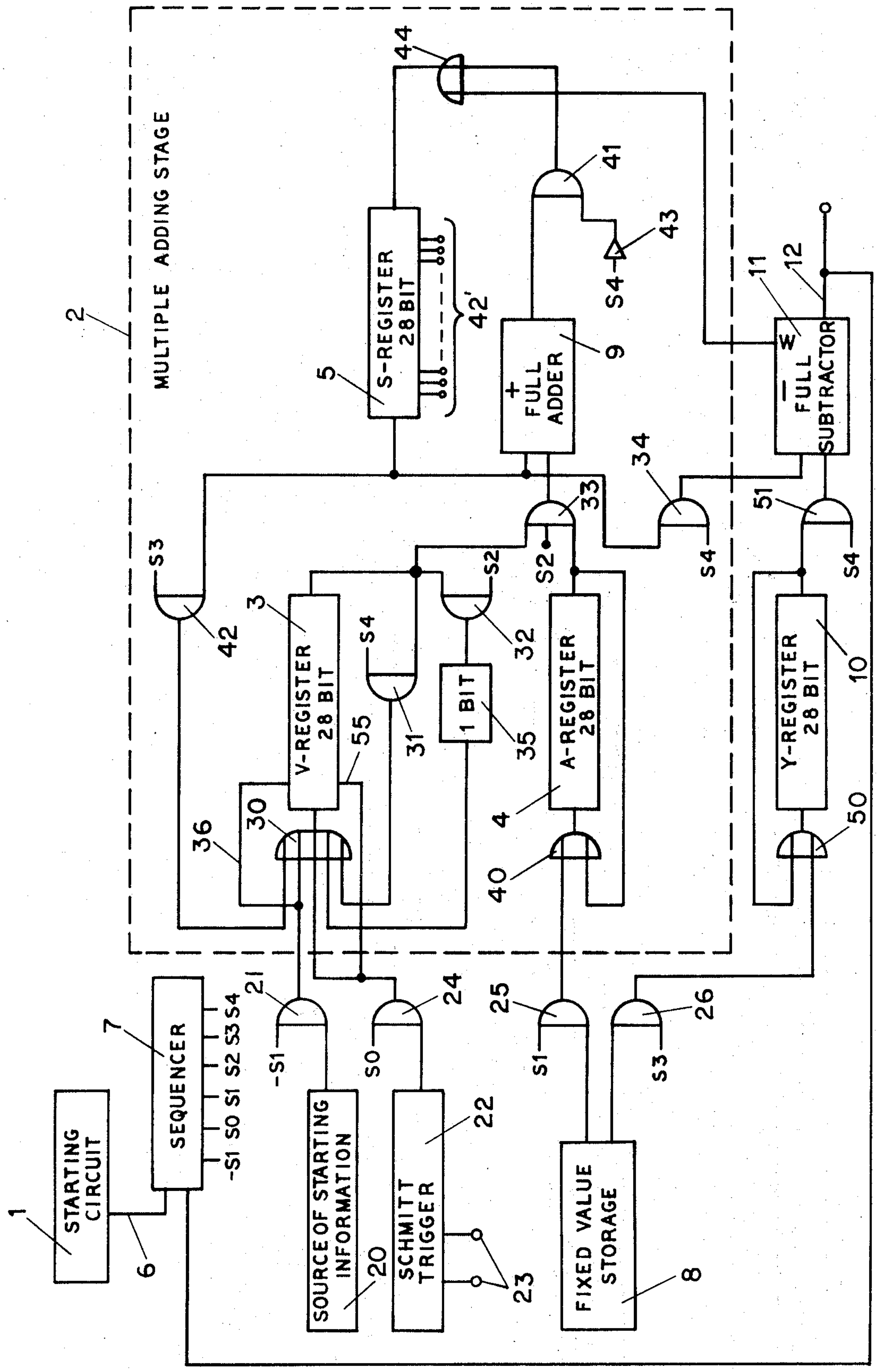
MULTIPLE ADDING STAGE
S-REGISTER 28 BIT
FULL ADDER
FULL SUBTRACTOR
V-REGISTER 28 BIT
1 BIT
A-REGISTER 28 BIT
Y-REGISTER 28 BIT
STARTING CIRCUIT
SEQUENCER
-S1 S0 S1 S2 S3 S4
SOURCE OF STARTING INFORMATION
SCHMITT TRIGGER
FIXED VALUE STORAGE

CIRCUIT ARRANGEMENT FOR GENERATING PSEUDO RANDOM NUMBERS

BACKGROUND OF THE INVENTION

The present invention relates to means for the generation of pseudo random numbers, and is especially directed to the provision of a circuit arrangement for generating such numbers. The circuit in accordance with the invention is particularly adaptable for use with a gaming apparatus, which provides an output such as a winning as a function of chance, although it will be apparent that the features of the invention may be otherwise employed within the teaching of the invention.

In the past it has been suggested that pseudo random numbers may be generated by means of a computer. Such computers are relatively rather complicated, and are therefore not generally suitable for use in commercial gaming devices.

German Pat. No. 1,054,535 discloses an apparatus for the positive variation of the instantaneous switching position of a switch, the switch being controlled by a cam disk or the like which is rotated at a constant rotational speed. In this arrangement, an intermediate member is provided between the cam disk and the switching means for control by the cam disk, whereby the intermediate member continuously varies the path of the cams. This arrangement thereby controls the switching positions of the switching means as a function of chance. The switching positions may in turn be useful in the control of the game feature carrier of a gaming apparatus. Such an arrangement, however, is subject to substantial wear in use, as well as to malfunctioning of components due to breakage. In addition, the arrangement introduces the possibility that equal switching positions will not follow a random sequence. In other words, the above described arrangement may not provide an output that is entirely dependent upon chance.

OBJECTS OF THE INVENTION

In view of the foregoing, it is the aim of the invention to achieve the following objects singly or in combination:

- to provide a circuit arrangement of the type described above which is as simple as possible in its structure, in other words to convert a predetermined algorithm into a simple circuit arrangement, in order to avoid the above stated disadvantages;
- to provide a circuit arrangement for producing pseudo random numbers in which repetition of numbers is avoided;
- to provide a circuit arrangement for producing pseudo random numbers, wherein the circuit has a long operational life, the circuit arrangement being readily fabricated, not being subject to wear and breakage, and in which sequences of operation not depending upon chance are avoided; and
- to avoid a circuit arrangement for producing pseudo random numbers in which a failure is immediately recognizable as distinguished from the above known systems, and in which the structural features of the system are rather simple and easy to fabricate.

SUMMARY OF THE INVENTION

In accordance with the invention, the above objects are achieved by providing a pseudo random number generator including an adder stage and a sequence switching stage, the sequence switching stage being controlled by a starting device. The adder stage is comprised of a multiplier connected for sequential bits or multiple addition. The adder stage includes first, second and third registers, and a full serial adder. A constant number is inserted in the second register, and the outputs of the first and second registers are serially added in the full adder and applied to the third register. The output of the third register is applied to the input of the first register under control of the sequence switching means.

The circuit further includes means responsive to a random occurrence, which may be derived from a conventional a.c. source, for introducing a random number into the first register at an initial starting step. Further operation of the circuits for generating other random numbers is responsive to a preceding random number stored in the third register. When the circuit is initially energized the instant of switching on of the circuit relative to the instantaneous phase position of the a.c. supply voltage is employed as the random chance occurrence.

The circuit arrangement may further include an additional register, with the outputs of the first register and additional register being applied to a serial full subtractor for production of a further pseudo random number.

The entire circuit in accordance with the invention may be fabricated by MOS techniques, and has long life and great reliability. It has further been found that the arrangement in accordance with the invention avoids the occurrence of equal sequences which may result by the operation of chance in prior art devices.

BRIEF FIGURE DESCRIPTION

In order that the invention may be more clearly understood, it will now be described, by way of example, with reference to the single accompanying drawing, which shows a block diagram of a circuit arrangement according to the invention.

DETAILED DESCRIPTION OF EXAMPLE EMBODIMENTS

Referring now to the drawing, a circuit arrangement in accordance with the invention, for generating pseudo random numbers, is comprised of a starting circuit 1 having an output connected by way of line 6 to a sequencer 7. The sequence 7 which may be an electronic sequence switch, is provided with a plurality of outputs −S1, S0, S1, S2, S3 and S4. The outputs of the sequencer 7 are stepped, in the direction from −S1 to S4, in response to outputs from the starting circuit 1.

The circuit is further provided with a source of starting information 20 having its output connected to one input of an AND-circuit 21, the other input thereof being connected to the output −S1 of the sequencer. A Schmitt trigger circuit 22 has its input connected to terminals 23, to which is applied an a.c. voltage of power line frequency whereby the Schmitt trigger applies an output pulse to one input of an AND-gate 24 when the input alternating voltage reaches a threshold level determined by the Schmitt trigger circuit. The other input of the AND-circuit 24 is connected to the output terminal S0 of the sequencer 7.

A fixed value storage circuit has one output connected to an input of AND-circuit 25, and another output connected to an input of an AND-circuit 26. The other inputs of the AND-circuits 25 and 26 are connected to the output terminals S1 and S3 respectively of the sequencer 7.

The circuit is further provided with a multiple adding stage 2 illustrated in the drawing in the dashed box. The stage 2 is comprised of a V-register 3, an A-register 4, and an S-register 5. These registers are conventional 28 bit shift registers. The stage 2 further comprises an OR-gate 30 having its output connected to the input stage of the register 3. The output stage of the register 3 is connected to one input of an AND-gate 31, one input of an AND-gate 32, and one input of an AND-gate 33. The other inputs of the AND-gates 31 and 32 are connected respectively to the output S4, and the output S2. One input of AND-gate 33 is connected to the output S2 of sequencer 7. The third input of the AND-circuit 33 is connected to the output stage of the register 4. The output of the AND-gate 31 is connected as one input of the OR-gate 30. The output of the AND-gate 32 is connected by way of a single bit delay circuit 35 as another input of the OR-gate 30. A further input of the OR-gate 30 is provided by the output of the AND-gate 24, and the output of the AND-gate 21 is applied as a still further input of the OR-gate 30. This input of the OR-gate 30 is also connected to the register 3, by way of line 36, to effect the erasing of all bits in the register 3 except at the first bit position.

The output of the AND-gate 25 is applied as one input to an OR-gate 40, the other input of the OR-gate 40 being connected to the output stage of the register 4. The output of the OR-gate 40 is connected to the input stage of the register 4.

The output of the AND-gate 33 is connected as one input to a full adder 9, the output of which is connected as one input of an AND-gate 41. The output of the AND-gate 41 is connected to the input stage of the S-register 5 via OR-gate 44. The output stage of the register 5 is connected as the other input of the full adder 9, as well as to one input of an AND-gate 42 and to one input of AND-gate 34. The other input of AND-gate 42 is connected to the output terminal S3 of the sequencer 7, and the output of the AND-gate 42 is connected as a still further input of the OR-gate 30. The other input of the AND-gate 41 is connected to the output of an inverter 43, the input of which is connected to the output S4 of the sequencer 7. The outputs of the stages of the register 5 may be connected to separate output terminals 42' as the output terminals of the circuit in accordance with the invention, whereby pseudo random numbers appear at these outputs. The full adder 9 is a serial full adder. The output of register 5 will be a serial output in accordance with the invention, whereby pseudo random numbers appear at this output during the sequence S3.

In addition the circuit of the invention further comprises a Y-register 10. This register may also be a conventional 28 bit shift register. The output of the AND-gate 26 is connected as one input of an OR-gate 50, the other input of the OR-gate 50 being connected to the output stage of the register 10. The output of the OR-gate 50 is connected to the input stage of the register 10. The output stage of the register 10 is further connected to one input of an AND-gate 51, the other input thereof being connected to the terminal S4 of the sequencer 7. The outputs of the AND-gates 34 and 51 are connected as the inputs to a serial full subtractor 11 of conventional design, the carry output of the subtractor 11 being connected by way of a line 12 as an input of the sequencer 7, whereby an output of the subtractor 11 resets the sequencer 7 by means of the starting circuit to provide an output at the terminal S2. The sum output of full subtractor 11 is connected to the second input of OR-gate 44.

The registers 3, 4, 5, and 10, which are conventional shift registers, are connected to be stepped with a clock frequency signal according to conventional techniques, not shown.

The fixed value storage circuit 8 may be, for example, a conventional PROM circuit, or a ROM circuit. When smaller numbers are involved in a system in accordance with the invention, the circuit 8 may be a diode matrix of conventional nature, having fixed circuit connections. Thus, the output signals of the fixed value storage circuit 8 are always present, but are interrogated only by the logic circuit in response to output signals at the terminals S1 or S3.

The starting of the circuit of the drawing may be accomplished in a number of different ways. For example, actuation of the circuit by means of the starting circuit 1 may be accomplished by switching on of an apparatus, such as a gaming apparatus for use in combination with the circuit of the invention, or it may be accomplished by means, not shown, dependent upon the output of a preceding result accumulated in the multiple adding stage 2. The particular means of starting the circuit is not a part of the present invention itself.

When the circuit is first turned on, the starting means 1 applies a pulse by way of the conductor 6 to the sequence switch 7, thereby providing an output on the first output terminal –S1 of the sequencer 7. At this time, and further in response to an output from an external source 20 of starting information, a "1" bit will be written in the first stage of the register 3, and by way of the line 36 the remaining stages of the register 3 are reset to "0". This condition corresponds to the initial information in the circuit. The source 20 may be a further output of an apparatus to which the circuit of the present invention may be connected, for example, a gaming apparatus.

The sequencer 7 is stepped in response to sequences in the apparatus to which the circuit of the invention is adapted to be connected, for example by way of the starting circuit 1. Thus, the sequencer may step forward in response to the completion of working steps in such apparatus. While it is not absolutely necessary that there be any correlation between the frequency of the sequence switch 7 and the clock frequency, it is preferable that the outputs of the sequencer 7 be synchronized with the clock frequency of the entire circuit. The sequence switch 7 may thus be a "static sequence switch".

When the sequence switch 7 is switched to provide an output at the terminal S0, a "1" bit will be stored in the first stage of the register 3 in response to the coincidence with an output pulse from the Schmitt trigger 22. Since the Schmitt trigger 22 has an input connected to a conventional power source, there will be no correlation between the clock frequency and the power source, and hence the bit is written in the register 3 of the circuit at a random time, by way of the AND-gate 24 and the OR-gate 30. During this second sequence, the second stage of the register 3 is set to "0" by way of the line 55. Thus, if the first sequence has taken place completely, a "1" is inserted in the register 3 at a random time in the clock pulse cycle, this insertion of the "1" bit being asynchronously related to the shift register clocks, since it is derived from the general power supply network by means of the Schmitt trigger circuit.

In the next sequence S1, i.e. wherein an output is provided on the output terminal S1, a constant number is written into the A-register 4 by way of the AND-gate 25 and the OR-gate 40. The fixed value storage circuit 8, which as above stated may be an ROM-circuit is scanned in response to the clock pulse cycle, so that a determined number may be thus written into the A-register 4. This number will, of course, be retained in the register 4, which is connected as a ring counter by way of the OR-gate 40.

In the next sequence S2 of the sequencer 7, the number present in the V-register 3 is multiplied by the number present in the A-register 4 by serial addition in the full adder 9, whereby the lowest 28 bits appear in the S-register 5. This number represents the pseudo random number. It is to be noted that this addition cannot be effected during the sequence S4 by virtue of the use of the AND-circuit 41 and the inverter 43, and can only be effected during the sequence S2 by virtue of AND-gate 33.

The random number which is thus stepped into the summing register 5 during the time S2, is transferred to the V-register 3 during the sequence time S3, and is maintained in the V-register 3 during the sequence S4, due to the ring around shift provided by the AND-circuit 31. With respect to the multiplication by serial addition in the full adder 9, the bits of the V-register 3 are sequentially multiplied with the digits of the A-register 4, whereby the resulting partial products are added in the S-register 5 in accordance with their digital value, so that only the lowest digits remain in the S-register 5.

On some occasions, for example, when the apparatus of the invention is employed in combination with a gaming apparatus, to provide a pseudo random number for operation of the gaming apparatus, it may be desirable to introduce a further constant in the determination of the pseudo random number. For this purpose, a further constant number Y is inserted in the Y-register 10. This number Y is applied to the Y-register 10 from the fixed value storage 8 by way of the AND-circuit 26 and OR-circuit 50 by a manner similar to that above described with respect to the addition of a number to the register 4, at the sequence time S3. The pseudo random number from the S-register 5 is written in the V-register 3 during the sequence S3, whereby the previous pseudo random number in the register 3 is erased. During the next sequence S4 a division is performed by means of the full subtractor 11 to provide a remainder classification, whereby the pseudo random number in the S-register 5 is divided by the constant number Y in the Y register 10. This division is performed in the full subtractor 11 by way of the AND-gates 34 and 51. The constant number Y is selected so that the range of the remainder classes is between 0 and a given maximum number, for example, the game characteristic features on a game feature carrier of a gaming apparatus. The result of the division in the full subtractor 11 may, if desired, be made available for use in the apparatus, such as the gaming apparatus, in which the pseudo number generator of the invention is employed. The sequence switch 7 is reset to a position at the beginning of sequence S2 form the output of the full subtractor 11 by way of the line 12. This may be effected, if desired, after evaluation of the data in the circuit 11.

The sequence switch 7 is stepped through the sequences –S1 to S1 only if prior to this operation the entire apparatus has been switched off, for example, by interruption of the power supply. Only in this instance is it necessary for the random number generator to produce a random number from a starting condition. As pointed out above, in this instance the variable is produced asynchronously with respect to the shift register clock from the general power supply network. In all other cases, the preceding random number forms the starting point for the generation of the next following random number. Thus, if a pseudo random number has already been produced by the system, the preceding pseudo random number is employed as the starting number for producing the next pseudo random number.

The entire sequence for producing the random number is the complete sequence for the entire work sequence of the apparatus. It begins with the insertion of the constant number into the register 4 during the sequence S1 and it ends with the selection of the random number from the register 5 in the sequence S4.

As above stated, a pseudo random number is generated in accordance with the invention and is present in the summing register 5. This number is transferred by way of the AND-gate 34 for combination with the information from the Y-register 10, so that another pseudo random number, which may be suitable for example for use in a gaming apparatus, is produced by the control subtractor 11. The number generated by the subtractor 11 which may for example be a number from 1 to 24, may correspond to the number of game feature symbols which are employed on the game feature symbol carriers on a gaming apparatus.

When a pseudo random number generator in accordance with the invention is employed in combination with a gaming apparatus, it does not directly determine the position of game feature carriers in the gaming apparatus, but is preferably employed merely in the variation of the position of the game feature carriers. In such an arrangement, positional pulses from the gaming apparatus are applied to the circuit in accordance with the invention, to define the starting points of operation. After a predetermined variation of the position, a switching off signal is applied to the game feature carrier. Thereafter the next random number is instantly calculated, so that it is immediately available for use.

It will be apparent that the entire circuitry of a pseudo random generator in accordance with the invention may be fabricated by MOS techniques.

Although the invention has been described with reference to specific example embodiments, it is to be understood, that it is intended to cover all modifications and equivalents within the scope of the appended claims.

What is claimed is:

1. A circuit for generating pseudo random numbers, comprising sequence switching means, first, second and third registers, adder means, means for inserting a constant number in said second register, means for applying the outputs of said first and second registers to said adder means, means applying the output of said adder means to said third register, first means responsive to said sequence switch for applying the output of said third register to said first register, second means responsive to said sequence switch for controlling circulation of data in said first register, and means for starting said sequence switch.

2. The circuit of claim 1, further comprising terminal means for connection to a source of a.c. power, means for producing a randomly occurring signal responsive to the phase position of a.c. power at said terminals, and means responsive to said sequence switching means for applying said randomly occurring signal to said first register.

3. The circuit of claim 1 in which said first, second and third registers are clock frequency operated shift registers, and further comprising a trigger circuit having an a.c. power supply input unsynchronized with the clock operation of said registers, and means responsive to said switching means for applying the output of said trigger circuit to said first register for applying a random signal thereto.

4. The circuit of claim 1, further comprising a fourth register, means applying a constant number to said fourth register, full subtractor means, and means for applying the outputs of said third and fourth registers to said full subtractor means for producing a pseudo random number.

5. The circuit of claim 4, wherein said means for applying a constant number to said fourth register comprises a source of a fixed number, and means responsive to said sequence switching means for applying the output of said source of a fixed number to said fourth register, and wherein said circuit further comprises means for circulating data in said fourth register.

6. The circuit of claim 5, wherein said fourth register is a clock operated shift register, and said subtractor means is a serial full subtractor and wherein said means applying the outputs of said third and fourth registers to said full subtractor means comprises data means responsive to said sequence switching means for applying the outputs of said third and fourth registers to said serial full subtractor means.

7. The circuit of claim 6, further comprising means responsive to the output of said serial full subtractor for controlling said sequence switching means.

8. The circuit of claim 1, wherein said means for inserting a constant number in said second register comprises a source of a fixed number, and means responsive to said switching means for applying the output of said source of a fixed number to said second register, and further comprising means for circulating data in said second register.

9. The circuit of claim 1, wherein said adder means is a serial full adder.

10. The circuit of claim 1, wherein said first, second and third registers are clock operated shift registers.

11. The circuit of claim 10, wherein said adder means is a serial full adder, said means applying the outputs of said first and second registers to said adder means comprises AND-gate means connected to apply the outputs of said first and second registers to said serial full adder as one input thereof, and further comprising means applying the output of said third register to said serial full adder as the second input thereof.

* * * * *